United States Patent
Liu et al.

(10) Patent No.: US 10,693,596 B2
(45) Date of Patent: Jun. 23, 2020

(54) DOWNLINK HARQ FEEDBACK TRANSMISSION

(71) Applicant: Telefonaktiebolaget LM Ericsson (publ), Stockholm (SE)

(72) Inventors: Jinhua Liu, Beijing (CN); Gen Li, Beijing (CN); Cong Shi, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 114 days.

(21) Appl. No.: 15/514,974

(22) PCT Filed: Dec. 1, 2016

(86) PCT No.: PCT/CN2016/108231
§ 371 (c)(1),
(2) Date: Mar. 28, 2017

(87) PCT Pub. No.: WO2018/098778
PCT Pub. Date: Jun. 7, 2018

(65) Prior Publication Data
US 2018/0234211 A1 Aug. 16, 2018

(51) Int. Cl.
*H04L 1/18* (2006.01)
*H04L 1/16* (2006.01)
(Continued)

(52) U.S. Cl.
CPC ........... *H04L 1/1812* (2013.01); *H04L 1/16* (2013.01); *H04L 1/1861* (2013.01); *H04L 5/0055* (2013.01); *H04W 72/042* (2013.01)

(58) Field of Classification Search
CPC ....... H04L 1/1812; H04L 1/16; H04L 1/1861; H04L 5/0055; H04L 1/1614; H04W 72/042
See application file for complete search history.

(56) References Cited

U.S. PATENT DOCUMENTS

2011/0235593 A1 9/2011 Gong et al.
2012/0218882 A1* 8/2012 Ko ................. H04L 1/1607
370/216
(Continued)

FOREIGN PATENT DOCUMENTS

CN 103339892 A 10/2013
CN 104125045 A 10/2014
CN 104243109 A 12/2014

OTHER PUBLICATIONS

International Search Report and Written Opinion issued in International Application No. PCT/CN2016/108231, dated Aug. 23, 2017, 11 pages.
(Continued)

*Primary Examiner* — Will W Lin
(74) *Attorney, Agent, or Firm* — Rothwell, Figg, Ernst & Manbeck, P.C.

(57) ABSTRACT

The embodiments disclose a method for an access node in a wireless network, and the method comprises a step of determining a HARQ feedback for each of one or more HARQ processes, for each of the plurality of communication devices, a step of generating a HARQ feedback table for the plurality of communication devices and a step of transmitting the HARQ feedback table to the plurality of communication devices. The embodiments also disclose a method for a communication device. The method comprises a step of receiving a HARQ feedback table from an access node, a step of obtaining HARQ feedbacks for the one or more HARQ processes of the communication device and a step of performing a retransmission according to the determination of the HARQ feedbacks of the communication device. The access node and communication device thereof are also disclosed according to the embodiments.

22 Claims, 10 Drawing Sheets

(51) Int. Cl.
*H04W 72/04* (2009.01)
*H04L 5/00* (2006.01)

(56) References Cited

U.S. PATENT DOCUMENTS

| | | | |
|---|---|---|---|
| 2012/0314697 A1 | 12/2012 | Noh et al. | |
| 2014/0245095 A1* | 8/2014 | Nammi | H04L 5/006 |
| | | | 714/749 |
| 2015/0049709 A1* | 2/2015 | Damnjanovic | H04L 5/0055 |
| | | | 370/329 |
| 2016/0073381 A1* | 3/2016 | Ratasuk | H04W 4/70 |
| | | | 370/329 |
| 2016/0119948 A1* | 4/2016 | Damnjanovic | H04L 5/0044 |
| | | | 370/280 |
| 2016/0142185 A1* | 5/2016 | Merlin | H04L 1/1607 |
| | | | 370/312 |
| 2016/0204905 A1* | 7/2016 | Lee | H04L 5/0055 |
| | | | 370/329 |
| 2016/0219560 A1* | 7/2016 | Chen | H04W 72/042 |
| 2017/0214494 A1* | 7/2017 | Qiang | H04L 1/1819 |
| 2017/0288817 A1* | 10/2017 | Cao | H04L 1/1812 |
| 2018/0014298 A1* | 1/2018 | Sun | H04W 72/0446 |
| 2018/0069665 A1* | 3/2018 | Lee | H04L 1/1812 |
| 2018/0123765 A1* | 5/2018 | Cao | H04L 1/1819 |
| 2018/0376490 A1* | 12/2018 | Lunttila | H04L 5/0055 |
| 2018/0376496 A1* | 12/2018 | Wang | H04W 72/1289 |

OTHER PUBLICATIONS

Huawei et al., "HARQ-ACK bundling in HD-FDD", 3GPP TSG RAN WGI Meeting #86bis RI-1608630, Lisbon, Portugal, Oct. 10-14, 2016, 2 pages.
Extended European Search Report dated Nov. 4, 2019 issued for European Patent Application No. 16922642.0, 9 pages.

* cited by examiner

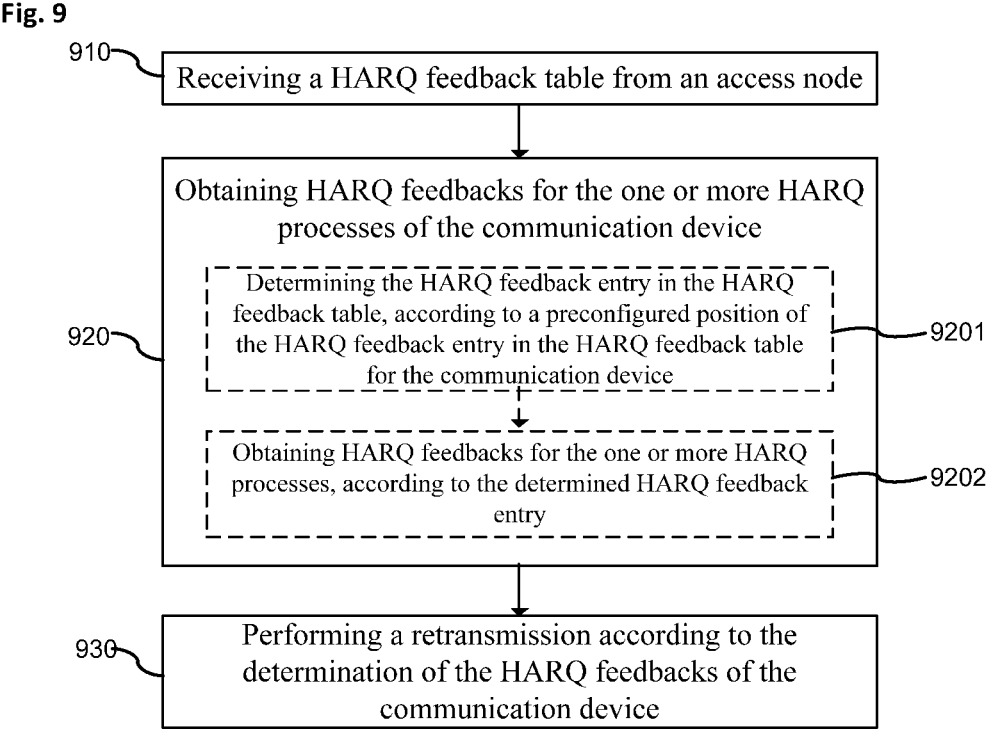
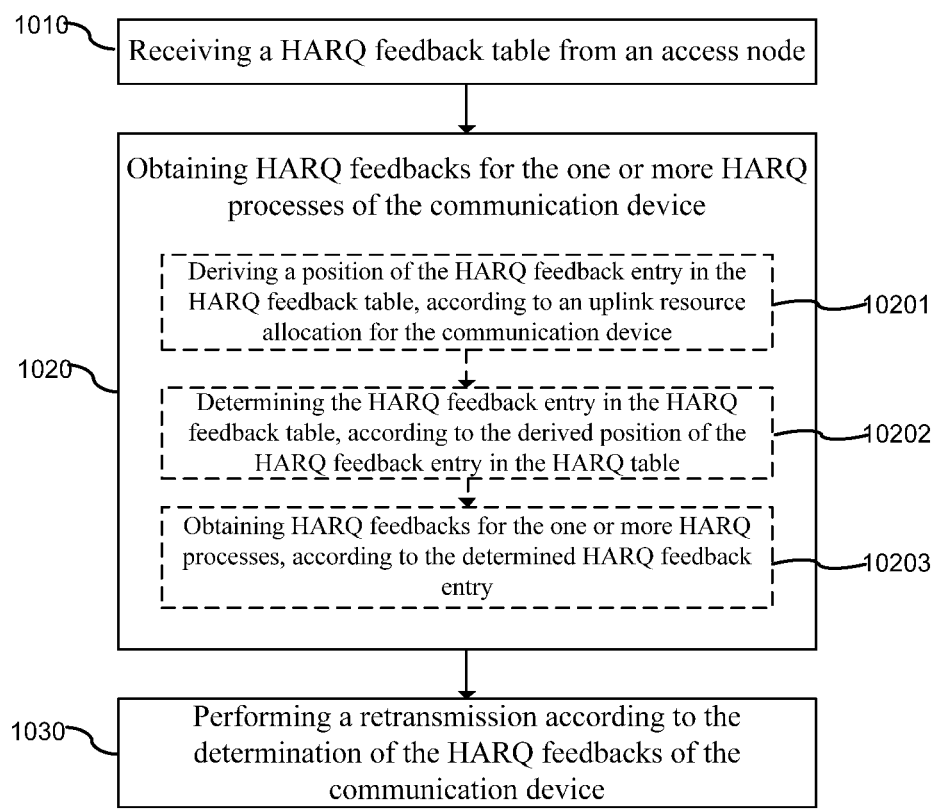

DOWNLINK HARQ FEEDBACK TRANSMISSION

CROSS REFERENCE TO RELATED APPLICATION(S)

This application is a 35 U.S.C. § 371 National Stage of International Patent Application No. PCT/CN2016/108231, filed Dec. 1, 2016, designating the United States, the disclosure of which is incorporated by reference.

TECHNICAL FIELD

The present disclosure generally relates to methods for transmitting HARQ feedbacks in a downlink feedback channel in wireless networks and access nodes and communication devices thereof.

BACKGROUND

In Long Term Evolution (LTE) systems, a downlink HARQ feedback channel, i.e., Physical Hybrid ARQ Indicator Channel (PHICH) is used to indicate an uplink HARQ transmission per HARQ process for one User Equipment (UE). In order to reduce an uplink signaling overhead, there is a fixed timing relationship between PHICH and the corresponding uplink transmission for LTE systems.

In the fifth generation (5G) communication systems, such fixed timing configuration for the downlink HARQ feedback channel is not feasible for certain scenarios, such as unlicensed operations, since the downlink feedback channel may be not available due to the uncertain usage of unlicensed band. Therefore, an asynchronous HARQ mechanism will be adopted, in which a downlink HARQ feedback is dynamically handled by allocating uplink grants with the same HARQ process identity and a new data indicator (NDI), which is used to request uplink retransmission. The uplink grant is carried in the downlink control channel using certain Downlink Control Information (DCI) format, e.g., DCI format 0 in LTE systems.

The aforementioned downlink feedback via NDI is applicable for the scheduled uplink transmission, where the HARQ feedback relies on the continuous scheduling grant transmission using the carried NDI bit. However, for some other cases, e.g., a semi-persistent scheduling (SPS), a contention-based access or small data packet transmission, there is no continuous DCI for uplink data transmission, therefore, a DCI transmission only for downlink HARQ feedback may be necessary. For the small data transmission cases, there might be large amount of communication devices, therefore the overhead for transmitting one DCI only for HARQ feedback of one small data transmission could be quite large, which is undesirable for the communication efficiency of wireless systems.

SUMMARY

It is an object of the present disclosure to resolve or alleviate at least one of the problems mentioned above. In this disclosure, a downlink HARQ feedback channel is presented, in which the above mentioned feedback bits and/or other identities for a plurality of communication devices could be aggregated into one downlink HARQ feedback channel with specific formats, leading to a reduced overhead of the downlink HARQ feedback transmission. The plurality of communication devices expecting the downlink HARQ feedback may monitor and decode the same one downlink feedback HARQ channel in order to obtain their respective HARQ feedbacks for HARQ processes. This downlink HARQ feedback channel could be exploited in both a scheduled uplink transmission and a non-scheduled uplink transmission, e.g., contention-based access or instant uplink access.

According to one aspect of the disclosure, there is provided a method in an access node of a wireless network, in which the access node communicates with a plurality of communication devices in the wireless network, and each of the plurality of communication devices corresponds to one or more HARQ processes. The method comprises a step of determining a HARQ feedback for each of one or more HARQ processes, for each of the plurality of communication devices, a step of generating a HARQ feedback table for the plurality of communication devices, and a step of transmitting the HARQ feedback table to the plurality of communication devices. The HARQ feedback table comprises HARQ feedback feedbacks for the plurality of communication devices.

According to another aspect of the disclosure, the HARQ feedback entry for the each of the plurality of communication devices comprises a communication device identity of the each of the plurality of communication devices, and the number of one or more HARQ processes of the each of the plurality of communication devices is preconfigured.

According to another aspect of the disclosure, there is provided a method in a communication device of a wireless network. The method comprises a step of receiving a HARQ feedback table from an access node, the HARQ feedback table comprising HARQ feedbacks for a plurality of communication devices in which the communication device is included, a step of obtaining HARQ feedbacks for the one or more HARQ processes of the communication device, and a step of performing a retransmission according to the determination of the HARQ feedbacks of the communication device.

BRIEF DESCRIPTION OF THE DRAWINGS

Exemplary features of the present disclosure are set forth in the appended claims. However, the present disclosure, its implementation mode, other objectives, features and advantages will be better understood through reading the following detailed description on the exemplary embodiments with reference to the accompanying drawings, where in the drawings:

FIG. 9 shows a flowchart for illustrating another method in a communication device for receiving HARQ feedbacks from an access node according to one or more embodiments of the disclosure;

FIG. 10 shows a flowchart for illustrating another method in a communication device for receiving HARQ feedbacks from an access node according to one or more embodiments of the disclosure;

DETAILED DESCRIPTION OF EMBODIMENTS

Figure 1:
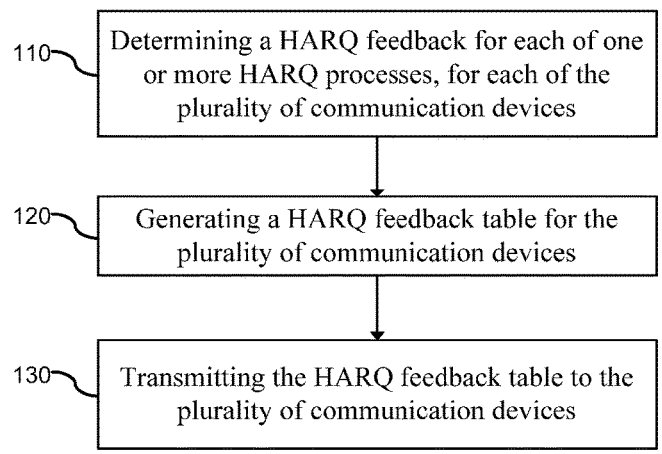
FIG. 1 shows a flowchart for illustrating a method in an access node of a wireless network for transmitting HARQ feedbacks to a plurality of communication devices according to one or more embodiments of the disclosure.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present disclosure is described below with reference to block diagrams and/or flowchart illustrations of methods, nodes, devices and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

FIG. 1 shows a flowchart for illustrating a method in an access node of a wireless network for transmitting HARQ feedbacks to a plurality of communication devices according to one or more embodiments of the disclosure. The access node communicates with a plurality of communication devices in the wireless network, and each of the plurality of communication devices corresponds to one or more HARQ processes. For each HARQ process of a communication device, there is a corresponding uplink transmission from the communication device to the access node. After an uplink transmission from the communication device, it will monitor and decode a downlink HARQ feedback channel to obtain the HARQ feedback, i.e., ACK or NACK for the HARQ process corresponding to the uplink transmission.

In this disclosure, the HARQ feedbacks for one or more HARQ processes of a plurality of communication devices are aggregated into one HARQ feedback table, which is transmitted in a physical downlink feedback channel as aforementioned. Compared to a PHICH transmission per each HARQ process for each communication device, it is desirable for the HARQ feedback table presented herein to reduce an overhead of transmitting HARQ feedbacks for a plurality of communication devices through aggregating HARQ feedbacks of a plurality of communication devices into one downlink HARQ feedback channel, especially for the case of small data packet transmission in 5G communication systems.

In step 110, the access node determines a HARQ feedback for each of one or more HARQ processes, for each of the plurality of communication devices. As aforementioned, upon receiving uplink transmissions for one or more HARQ processes of a communication device, the access node will decode the uplink transmissions and determines the HARQ feedbacks, i.e., ACK or NACK by employing a Cyclic Redundancy Check (CRC) or other checking mechanisms.

In step 120, the access node generates a HARQ feedback table for the plurality of communication devices. After step 110, the HARQ feedbacks for a plurality of communication devices are determined by the access node. Then, in step 120, the access node may generate a HARQ feedback table for the plurality of communication device according to certain formats for the HARQ feedback table, which aggregates the HARQ feedbacks of one or more HARQ processes for a plurality of communication devices. For instance, it should be mentioned that the HARQ feedback table may comprises a plurality of HARQ feedback entries for the corresponding plurality of communication devices, and a HARQ feedback entry for a communication device comprises a HARQ feedback for each of one or more HARQ processes of the communication device. The HARQ feedback is one of ACK or NACK. It is appreciated for the skilled in the art to utilize different formats for a HARQ feedback table to aggregate multiple HARQ feedbacks for a plurality of communication devices into one HARQ feedback channel, without departing the sprit and teaching of the present disclosure.

In step 130, the access node transmits the HARQ feedback table to the plurality of communication devices. It is preferable that the HARQ feedback table for the plurality of communication devices is transmitted in one physical downlink feedback channel for example. It is advantageous for the person skilled in the art to design the physical downlink feedback channel according to different system configurations using different coding and modulation schemes, for example.

In the present disclosure, communication devices also known as mobile terminals, wireless terminals and/or UE are enabled to communicate wirelessly with an access node in a wireless communication network, sometimes also referred to as a cellular radio system. For instance, a communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or Personal Computer (PC). The communication device may be a portable, pocket-storable, hand-held, computer-comprised, or vehicle-mounted mobile device, enabled to communicate voice and/or data, via a wireless or wired connection.

Typically, an access node may serve or cover one or several cells of the wireless communication system. That is, the access node provides radio coverage in the cell(s) and communicates over an air interface with communication devices operating on radio frequencies within its range. The access node in some wireless communication systems may be also referred to as "eNB", "eNodeB", "NodeB" or "B node" for example, depending on the technology and terminology used. In the present disclosure, the access node may also be referred to as a Base Station (BS). The access node may be of different classes such as e.g. macro eNodeB, home eNodeB or pico base station, or relay node in heterogeneous or homogeneous networks, based on transmission power and thereby also cell size.

Figure 2:
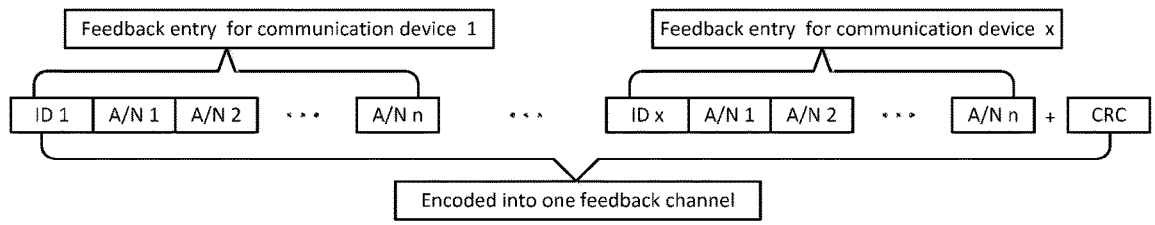
FIG. 2 schematically illustrates a format for a HARQ feedback table according to one or more embodiments of the disclosure.

FIG. 2 schematically illustrates a format for a HARQ feedback table according to one or more embodiments of the disclosure.

It is illustrated that there are x communication devices served by an access node, and for each communication device, there are n HARQ feedbacks for the corresponding n HARQ processes. The notation of A/N is an abbreviation of ACK/NACK, which is corresponding to a HARQ feedback of a HARQ process for a communication device. More generally, a HARQ feedback entry for each of a plurality of communication devices served by an access node comprises a communication device identity (ID) of the each of the plurality of communication devices, and the number of one or more HARQ processes of the each of the plurality of communication devices, e.g., n in FIG. 2 is preconfigured by wireless networks. The HARQ feedback entries for the x communication devices and a CRC are encoded into a downlink HARQ feedback channel according to a specific coding and modulation scheme. According to a communication device identity, i.e., the field of ID in FIG. 2, upon receiving the HARQ feedback channel, the communication device could know which HARQ feedback entry of the HARQ feedback table is corresponding to the communication device itself. It should be mentioned that it is assumed that all the communication devices corresponds to a same number of HARQ processes, i.e., n in FIG. 2, while the person skilled in the art could understand that preconfigured number of the HARQ processes for different communication devices could be different in certain application scenarios, since the maximum number of HARQ processes supported by different communication devices may be different for example.

Figure 3:
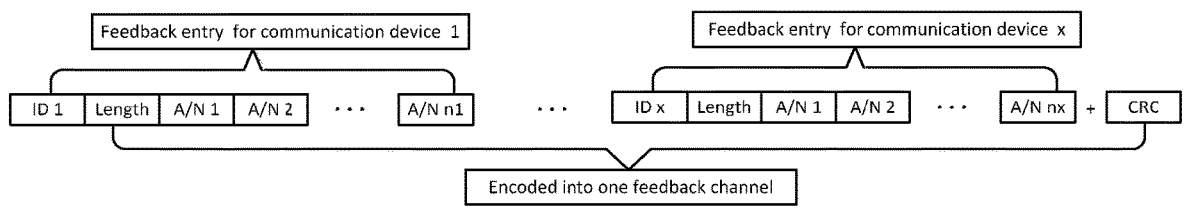
FIG. 3 schematically illustrates a format for another HARQ feedback table according to one or more embodiments of the disclosure.

FIG. 3 schematically illustrates a format for another HARQ feedback table according to one or more embodiments of the disclosure.

It is illustrated that there are x communication devices served by an access node, and for communication device i, i=1, 2, . . . , x, there are $n_i$ HARQ feedbacks for the corresponding $n_i$ HARQ processes for the communication device i. Therefore, the numbers of HARQ feedbacks, i.e., length field in FIG. 3, are different for different communication devices. More generally, the HARQ feedback entry for each of a plurality of communication devices served by the access node comprises a communication device identity and a HARQ process number of the each of the plurality of communication devices, and the number of one or more HARQ processes of the each of the plurality of communication devices is variable. Furthermore, the HARQ process number represents the number of the one or more HARQ processes of a communication device, e.g., the length field in FIG. 3. Preferably, the length indicator of the last communication device may be removed, since the receiving communication device may derive the number of HARQ processes for the last communication device. It should be also appreciated that this format of HARQ feedback channel in FIG. 3 will be more flexible to be adopted in more application scenarios.

Figure 4:
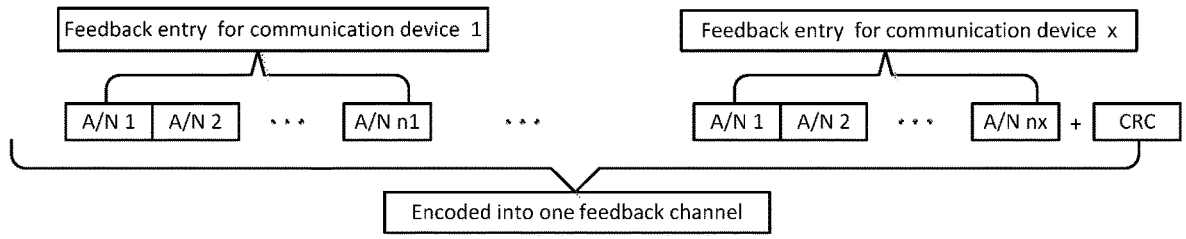
FIG. 4 schematically illustrates a format for another HARQ feedback table according to one or more embodiments of the disclosure.

FIG. 4 schematically illustrates a format for another HARQ feedback table according to one or more embodiments of the disclosure.

In this HARQ feedback table, a position of a HARQ feedback entry in the HARQ feedback table for each of a plurality of communication devices could be preconfigured by the number of HARQ processes of the each of the plurality of communication devices as well as a starting position in the HARQ feedback table without an explicit communication device identity field.

Each communication device, which has uplink transmission shall monitor the feedback channel and determine its corresponding HARQ feedback entry from a predefined position for the each communication device in the HARQ feedback table. Therefore, the HARQ feedback table in FIG. 4 is a static aggregation of HARQ feedbacks compared with the ones in FIGS. 2 and 3. It should be noted that the position of a HARQ feedback entry for a communication device in a HARQ feedback table could be preconfigured or could be dynamically configured via certain signalings, such as Radio Resource Control (RRC), Media Access Control (MAC) Control Element (CE) or DCI in Physical Downlink Control Channel (PDCCH). Since the position of HARQ feedbacks of different communication devices in the HARQ feedback table may be preconfigured, therefore, it is not necessary to explicitly include the communication device identities in the HARQ feedback table, which reduces the transmission overhead for the HARQ feedbacks.

Figure 5:
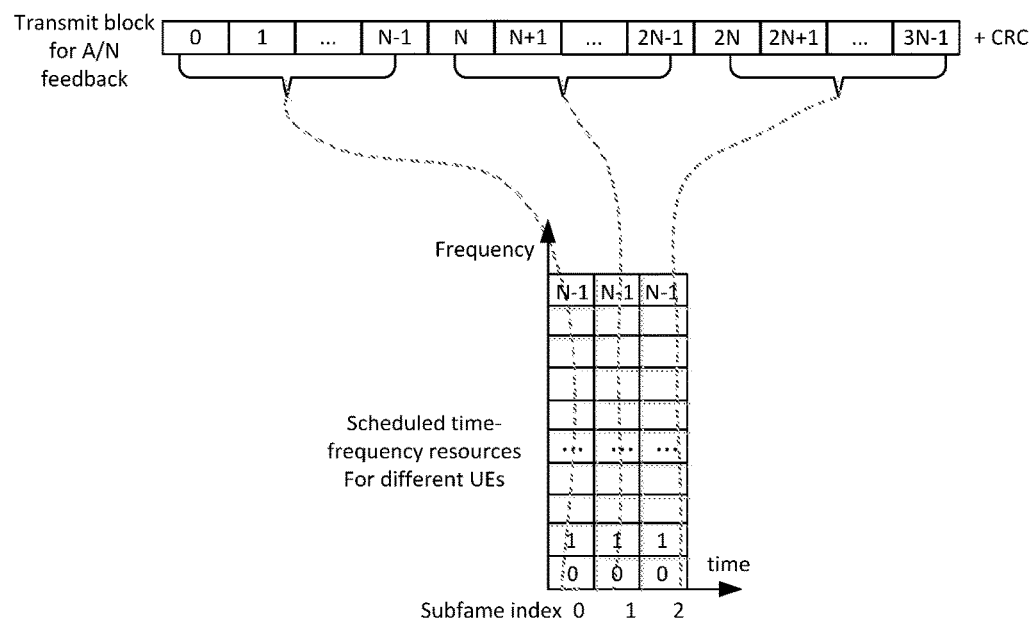
FIG. 5 schematically illustrates a format for another HARQ feedback table according to one or more embodiments of the disclosure.

FIG. 5 schematically illustrates a format for another HARQ feedback table according to one or more embodiments of the disclosure.

In this HARQ feedback table, a position of a HARQ feedback entry in the HARQ feedback table for each of a plurality of communication devices could be determined by an uplink resource allocation for the each of the plurality of communication devices. More specifically, a HARQ feedback for a HARQ process in the HARQ feedback table for each communication device can be derived based at least in part on the starting and ending Resource Element (RE) or RE set index allocated for each of the communication devices. It should be noted that a RE in this disclosure may specifically refer to a basic resource allocation unit, depending on different time, frequency and code resource allocation schemes in different communication systems, and it could be a Physical Resource Block (PRB) in LTE systems for example. More preferably, if a Carrier Aggregation (CA) or across Transmission Time Interval (TTI) scheduling is employed for a communication device, an uplink transmission resource for the communication device may be allocated across different carriers in frequency domain and/or different subframes in time domain; therefore, the HARQ feedback for a HARQ process in the HARQ feedback table for the communication device could be derived based on additional indicators, such as but not limited to a carrier index and/or a subframe index for example. It should be mentioned that with the teaching in this disclosure, it is desirable for the skilled in the art to have different mappings between a position of a HARQ feedback in a HARQ feedback table and an uplink resource allocation for a communication device in different communication systems. In FIG. 5, it is assumed that in an Orthogonal Frequency Division Multiplexing (OFDM) system, a grid (i.e., the smallest square shown FIG. 5) in time and frequency domain represents a scheduled uplink time and frequency resource allocated for a communication device, therefore the grid in FIG. 5 may represent a set of PRBs, which is allocated for the communication device to perform uplink transmission in one subframe. It should be also mentioned that in FIG. 5, the basic unit in the time domain may be a subframe in LTE systems.

Taking the first N fields in the HARQ feedback table in FIG. 5 for example, they represent N HARQ feedbacks for N respective uplink transmissions for N respective communication devices in subframe 0, and the position of each of the N HARQ feedback is determined according to the uplink resource allocation for the corresponding each of the N communication device in subframe 0. Since both the access node and communication devices know the mapping relationship between an uplink resource allocation and a HARQ feedback position in the HARQ feedback table, each communication device could determine the position of its HARQ feedback according to its uplink resource allocation upon receiving the HARQ feedback table from the access node. It should be noted that it is not necessary to include the communication device identities in the HARQ feedback table as for the HARQ feedback table in FIG. 5, therefore, the transmission overhead of the HARQ feedback table in this format could be further reduced, leading to better energy efficiency for the communication systems.

Figure 6:
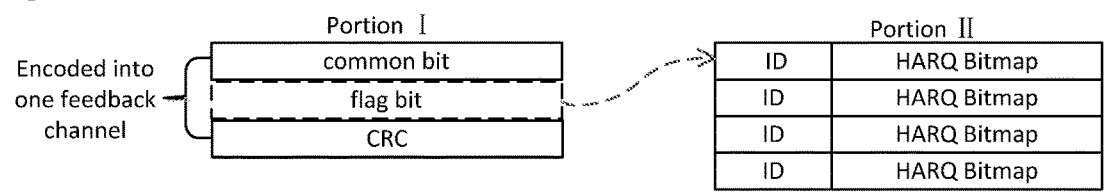
FIG. 6 schematically illustrates a format for another HARQ feedback table according to one or more embodiments of the disclosure.

FIG. 6 schematically illustrates a format for another HARQ feedback table according to one or more embodiments of the disclosure.

As illustrated, the HARQ feedback table comprises a first portion and a second portion, where the first portion comprises a common bit and a preferable flag bit, and the common bit is ACK or NACK bit if most of HARQ feedbacks of a plurality of communication devices being ACK or NACK correspondingly. The second portion corresponds to a set of communication devices from the plurality of communication devices, which comprises a HARQ feedback entry for each of the set of communication devices. It should be mentioned that at least one HARQ feedback of each of the set of communication devices is opposite to the common bit. It is also assumed that each communication device of the plurality of communication devices corresponds to one or more HARQ processes.

In FIG. 6, a HARQ feedback entry for a communication device from the set of communication devices comprises a communication device identity (ID) and a HARQ bitmap for mapping the HARQ feedbacks to the HARQ processes for this communication device. There could be different HARQ bitmaps according to different mapping designs. For one example, a HARQ feedback entry for each of the set of communication devices comprises a communication device identity for the each of the set of communication devices, and HARQ feedbacks of one or more HARQ processes for the each of the set of communication devices. For another example, the HARQ feedback entry for each of the set of communication devices comprises a communication device identity for each of the set of communication devices and at least one HARQ process identity of the at least one HARQ process from the one or more HARQ processes, and HARQ feedbacks corresponding to the at least one HARQ process identity being opposite to the common bit. It will be desirable for the skilled in the art to design different HARQ bitmaps without departing the teaching of the disclosure.

It should be also mention that a flag bit is preferable to be included in the first portion of the HARQ feedback, indicating whether the second portion is empty or not in the HARQ feedback table. It may be desirable to utilize the format of HARQ feedback table of FIG. 6, if the communication channel condition is relatively good or bad, in which the number of ACK feedbacks and the number of NACK feedbacks for the HARQ feedbacks for the plurality of communication devices could be not comparable. In such channel conditions, this two-portion HARQ feedback table could reduce the overhead of transmission of the HARQ feedbacks for the plurality of communication devices, since the one common bit may represent as many as ACK or NACK feedbacks for the plurality of communication devices, leading to a smaller size of the second portion in the HARQ feedback table. For example, if the communication channel condition is relatively good, it is determined that the common bit is ACK, therefore only the communication devices with at least one NACK feedback could be included in the second portion of the HARQ feedback table. As the communication channel condition becomes better, the size of the second portion of the HARQ feedback table gets smaller, and the total transmission overhead of the HARQ feedback table could get smaller accordingly. For example, if all HARQ feedbacks of the plurality of communication devices are ACK or NACK, the second portion could be empty, which may be preferably indicated by the flag bit as aforementioned. After a communication device receiving the HARQ feedback table, it may determine whether the flag bit indicating the second portion of the table is empty or not, and if the flag bit indicates that the second portion is empty, the communication device may determine its HARQ feedbacks only according to the common bit in the first portion of the table, which may speed up the HARQ feedback determination procedure for the communication device.

Figure 7:
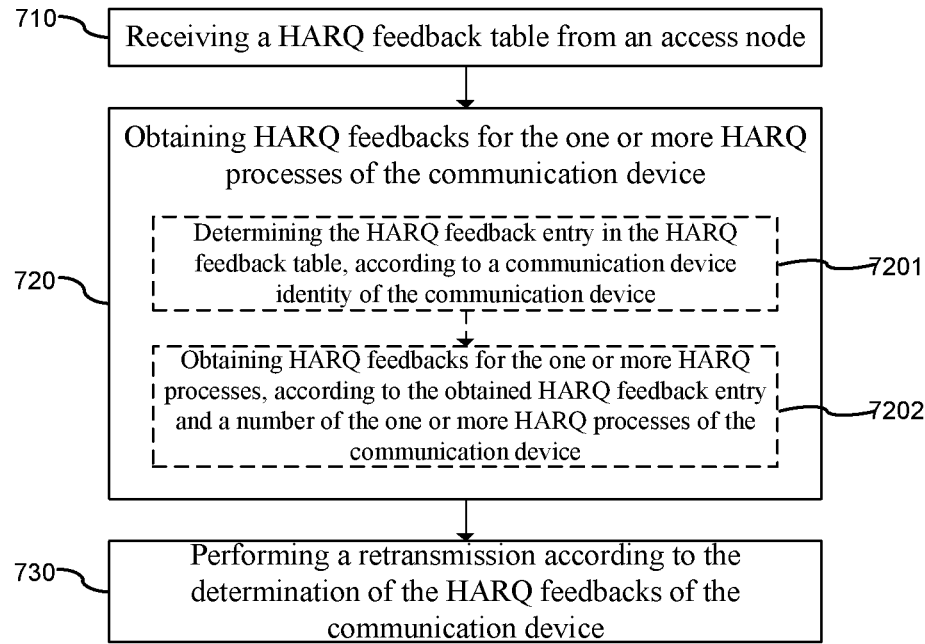
FIG. 7 shows a flowchart for illustrating a method in a communication device for receiving HARQ feedbacks from an access node according to one or more embodiments of the disclosure.

FIG. 7 shows a flowchart for illustrating a method in a communication device for receiving HARQ feedbacks from an access node according to one or more embodiments of the disclosure.

It is assumed that the communication device has one or more uplink transmissions, which are corresponding to one or more HARQ processes. After the uplink transmission, the communication device will monitor the HARQ feedback channel to receive a HARQ feedback table from a access node, in order to obtain HARQ feedback for the communication device. It should be mentioned again that the HARQ feedback table comprises the HARQ feedbacks for a plurality of communication devices.

At step 710, the communication device receives a HARQ feedback table from an access node, which serves a plurality of communication devices. The HARQ feedback table comprises HARQ feedbacks for a plurality of communication devices, and it could be organized as the format of HARQ feedback table in FIG. 2 for example, where the number of the one or more HARQ processes of the communication device is preconfigured as discussed with reference to FIG. 2.

At step 720, the communication device obtains HARQ feedbacks for the one or more HARQ processes of the communication device. More preferably, the step 720 may comprise the following two preferable steps. At step 7201, the communication device determines the HARQ feedback entry in the HARQ feedback table, according to a communication device identity of the communication device. Once the communication device receives the HARQ feedback table, it may search its communication device identity, e.g., ID field in FIG. 2 to obtain its HARQ feedback entry. After the HARQ feedback entry is obtained by the communication device, at step 7202, the communication device obtains HARQ feedbacks for the one or more HARQ processes, according to the obtained HARQ feedback entry and a preconfigured number of the one or more HARQ processes of the communication device. Since the number of the one or more HARQ processes of the communication device is preconfigured, the communication device could know the length of its HARQ feedback entry and obtain the HARQ feedbacks accordingly.

At step 730, the communication device performs a retransmission according to the determination of the HARQ feedbacks of the communication device. For a specific HARQ process, if its HARQ feedback is ACK, it represents the uplink transmission has been successfully received by the access node, and if the HARQ feedback is NACK, the communication device may perform a retransmission for the HARQ process.

Figure 8:
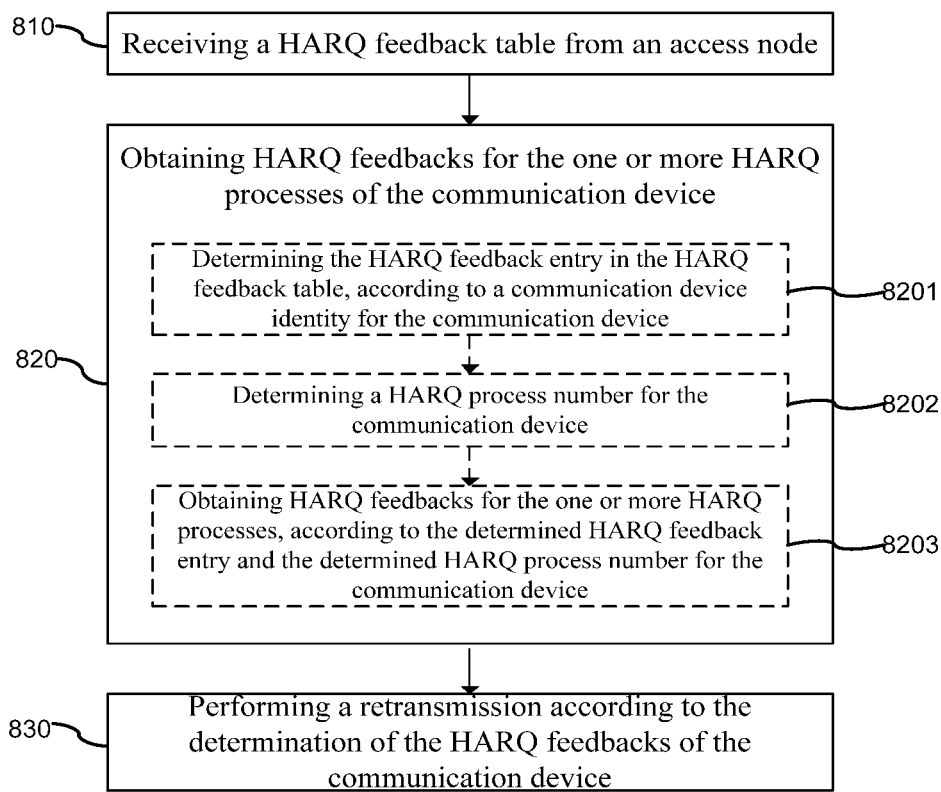
FIG. 8 shows a flowchart for illustrating another method in a communication device for receiving HARQ feedbacks from an access node according to one or more embodiments of the disclosure.

FIG. 8 shows a flowchart for illustrating another method in a communication device for receiving HARQ feedbacks from an access node according to one or more embodiments of the disclosure. The system setup of FIG. 8 is similar to that of FIG. 7 as discussed above.

At step 810, the communication device receives a HARQ feedback table from an access node, which serves a plurality of communication devices. The HARQ feedback table comprises HARQ feedbacks for a plurality of communication devices in which the communication device is served, and it could be organized as the format of HARQ feedback table in FIG. 3, where the number of the one or more HARQ processes of the communication device is variable. For example, in FIG. 3, the number of the one or more HARQ processes of the communication device is indicated by the length field, which may represent a varying number of HARQ processes of the communication device. Therefore, a communication device has to determine the number of the HARQ processes first to accurately determine the size of its HARQ feedback entry, which will be discussed below.

At step 820, the communication device obtains HARQ feedbacks for the one or more HARQ processes of the communication device. More preferably, the step 820 may comprise the following three preferable steps of 8201, 8202 and 8203. At step 8201, the communication device determines the HARQ feedback entry in the HARQ feedback table, according to a communication device identity for the communication device. At step 8202, the communication device determines the HARQ process number for the communication device. Referring back to FIG. 3 for example, the length field in FIG. 3 represents the HARQ process number of the communication device. Once this length field is determined, the communication device may know the number of HARQ processes. At step 8203, the communication device obtains HARQ feedbacks for the one or more HARQ processes, according to the determined HARQ feedback entry and the determined HARQ process number for the communication device.

At step 830, the communication device performs a retransmission according to the determination of the HARQ feedbacks of the communication device.

FIG. 9 shows a flowchart for illustrating another method in a communication device for receiving HARQ feedbacks from an access node according to one or more embodiments of the disclosure. The system setup of FIG. 9 is similar to that of FIG. 7 as discussed above.

At step 910, the communication device receives a HARQ feedback table from an access node, which serves a plurality of communication devices. The HARQ feedback table comprises HARQ feedbacks for a plurality of communication devices in which the communication device is served, and it could be organized as the format of HARQ feedback table in FIG. 4, where a position of a HARQ feedback entry for a communication device is preconfigured in the HARQ feedback table.

At step 920, the communication device obtains HARQ feedbacks for the one or more HARQ processes of the communication device. More preferably, the step 920 may comprise the following two preferable steps of 9201 and 9202. At step 9201, the communication device determines the HARQ feedback entry in the HARQ feedback table, according to a preconfigured position of the HARQ feedback entry in the HARQ feedback table for the communication device, and at step 9202, the communication device obtains HARQ feedbacks for its one or more HARQ processes, according to the determined HARQ feedback entry.

At step 930, the communication device performs a retransmission according to the determination of the HARQ feedbacks of the communication device.

FIG. 10 shows a flowchart for illustrating another method in a communication device for receiving HARQ feedbacks from an access node according to one or more embodiments of the disclosure. The system setup of FIG. 10 is similar to that of FIG. 7 as discussed above.

At step 1010, the communication device receives a HARQ feedback table from an access node, which serves a plurality of communication devices. The HARQ feedback table comprises HARQ feedbacks for a plurality of communication devices in which the communication device is served, and it could be organized as the format of HARQ feedback table in FIG. 5, where a position of the HARQ feedback entry in the HARQ feedback table for the each of the plurality of communication devices being determined by an uplink resource allocation for the plurality of communication devices. For the details of the format of HARQ feedback table, please refer back to the above mentioned description as for FIG. 5. It is also desirable for the person skilled in the art to design different implementations for mapping relationship between the uplink resource allocation and the position of corresponding HARQ feedbacks in a HARQ feedback table for a communication device.

At step 1020, the communication device obtains HARQ feedbacks for the one or more HARQ processes of the communication device. More preferably, the step 1020 may comprise the following three preferable steps of 10201, 10202 and 10203. At step 10201, the communication device derives a position of the HARQ feedback entry in the HARQ feedback table, according to an uplink resource allocation for the communication device. At step 10202, the communication device determines the HARQ feedback entry in the HARQ feedback table, according to the derived position of the HARQ feedback entry in the HARQ feedback table, and at step 10203, the communication device obtains HARQ feedbacks for the one or more HARQ processes, according to its determined HARQ feedback entry.

At step 1030, the communication device performs a retransmission according to the determination of the HARQ feedbacks of the communication device.

Figure 11:
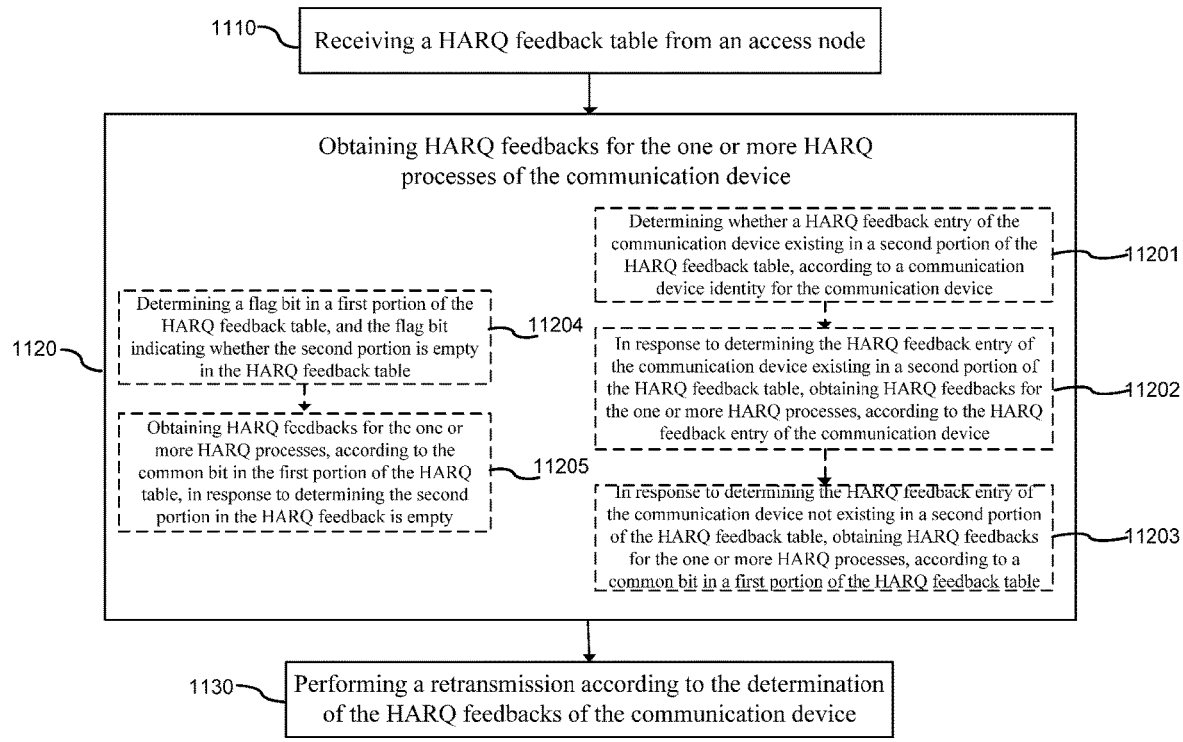
FIG. 11 shows a flowchart for illustrating another method in a communication device for receiving HARQ feedbacks from an access node according to one or more embodiments of the disclosure.

FIG. 11 shows a flowchart for illustrating another method in a communication device for receiving HARQ feedbacks from an access node according to one or more embodiments of the disclosure. The system setup of FIG. 11 is similar to that of FIG. 7.

At step 1110, the communication device receives a HARQ feedback table from an access node, which serves a plurality of communication devices. The HARQ feedback table comprises HARQ feedbacks for a plurality of communication devices in which the communication device is served, and it could be organized as the format of HARQ feedback table in FIG. 6, where the HARQ feedback table comprises a first portion and a second portion. For the details of the format of HARQ feedback table, please refer back to the above mentioned description as for FIG. 6.

At step 1120, the communication device obtains HARQ feedbacks for the one or more HARQ processes of the communication device. More preferably, the step 1120 may comprise the following five preferable steps of 11201, 11202, 11203, 11204 and 11025.

At step 11201, the communication device determines whether a HARQ feedback entry of the communication device exists in a second portion of the HARQ feedback table, according to a communication device identity for the communication device. At step 11202, in response to determining the HARQ feedback entry of the communication device existing in a second portion of the HARQ feedback table, the communication device obtains HARQ feedbacks for the one or more HARQ processes, according to the HARQ feedback entry of the communication device. At step 11203, in response to determining the HARQ feedback entry of the communication device not existing in a second portion of the HARQ feedback table, the communication device obtains HARQ feedbacks for the one or more HARQ processes, according to the common bit in the first portion of the HARQ feedback table. If a preferable flag bit is further included in the first portion of the HARQ feedback table, the step 1120 may further comprises steps 11204 and 11205. The flag bit indicates whether the second portion is empty in the HARQ feedback table. At step 11204, the communication device determines a flag bit in the first portion of the HARQ feedback table, and at step 11205, the communication device obtains HARQ feedbacks for the one or more HARQ processes, only according to the common bit in the first portion of the HARQ feedback table, in response to determining the second portion in the HARQ feedback is empty. In response to determining the second portion in the HARQ feedback is not empty, the communication device may obtain its HARQ feedback through the steps of 11201-11203, which are discussed above.

At step 1130, the communication device performs a retransmission according to the determination of the HARQ feedbacks of the communication device.

It should noted that for purposes of simplicity of explanation, the one or more methods shown herein, for example, in the form of a flow chart or flow diagram, are shown and described as a series of steps, it is to be understood and appreciated that the methods are not limited by the order of steps, as some steps may, in accordance therewith, occur in a different order and/or concurrently with other acts from that shown and described herein. For example, the performing orders of steps 11201-11203 and steps 11204-11205 could be interchanged, which means the communication device may first determine the flag bit in the first portion and alternatively, it may also first determine whether its HARQ feedback entry exists in the second portion. Any modification, variation and equivalent should be considered falling within the scope of the appended claims.

Figure 12:
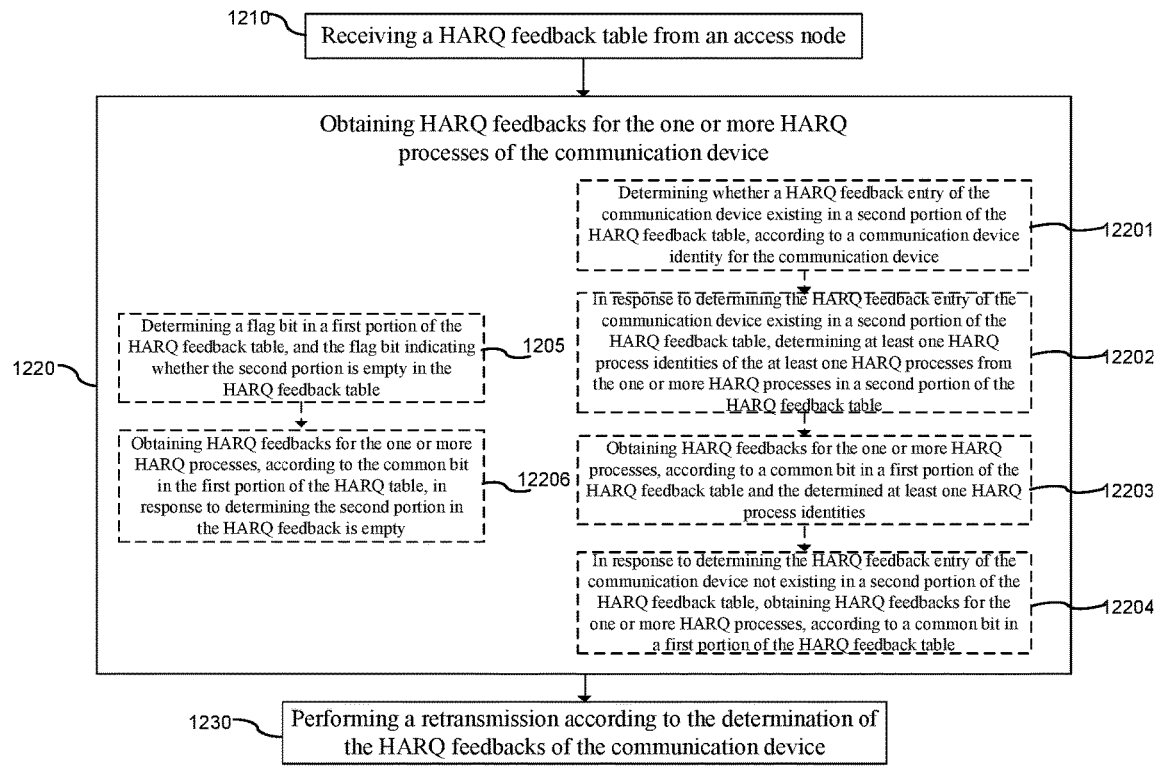
FIG. 12 shows a flowchart for illustrating another method in a communication device for receiving HARQ feedbacks from an access node according to one or more embodiments of the disclosure.

FIG. 12 shows a flowchart for illustrating another method in a communication device for receiving HARQ feedbacks from an access node according to one or more embodiments of the disclosure. The system setup of FIG. 12 is similar to that of FIG. 7.

At step 1210, the communication device receives a HARQ feedback table from an access node, which serves a plurality of communication devices. The HARQ feedback table comprises HARQ feedbacks for a plurality of communication devices in which the communication device is served, and it could be organized as the format of HARQ feedback table in FIG. 6, where the HARQ feedback table comprises a first portion and a second portion. For the details of the format of HARQ feedback table, please refer back to the above mentioned description as for FIG. 6.

At step 1220, the communication device obtains HARQ feedbacks for the one or more HARQ processes of the communication device. More preferably, the step 1220 may comprise the following five preferable steps of 12201, 12202, 12203, 12204, 12205 and 12206, which are discussed in details below.

At step 12201, the communication device determines whether a HARQ feedback entry of the communication device exists in a second portion of the HARQ feedback table, according to a communication device identity for the communication device.

At step 12202, in response to determining the HARQ feedback entry of the communication device existing in a second portion of the HARQ feedback table, the communication device determines at least one HARQ process identity of the at least one HARQ process from the one or more HARQ processes in a second portion of the HARQ feedback table. It should be mentioned at the HARQ feedbacks of at least one HARQ process are opposite to the common bit. At step 12203, the communication device obtains HARQ feedbacks for the one or more HARQ processes, according to a common bit in a first portion of the HARQ feedback table and the determined at least one HARQ process identity, and at step 12204, the communication device in response to determining the HARQ feedback entry of the communication device not existing in a second portion of the HARQ feedback table, the communication device obtains HARQ feedbacks for the one or more HARQ processes, according to a common bit in a first portion of the HARQ feedback table.

If a preferable flag bit is further included in the first portion of the HARQ feedback table, the step 1220 may further comprises steps 12205 and 12206. At step 12205, the communication device determines a flag bit in the first portion of the HARQ feedback table, and the flag bit indicating whether the second portion is empty in the HARQ feedback table, and at step 11206, the communication device obtains HARQ feedbacks for the one or more HARQ processes, according to the common bit in the first portion of the HARQ feedback table, in response to determining the second portion in the HARQ feedback is empty.

At step 1230, the communication device performs a retransmission according to the determination of the HARQ feedbacks of the communication device.

It should noted that for purposes of simplicity of explanation, the one or more methods shown herein, for example, in the form of a flow chart or flow diagram, are shown and described as a series of steps, it is to be understood and appreciated that the methods are not limited by the order of steps, as some steps may, in accordance therewith, occur in a different order and/or concurrently with other acts from that shown and described herein. For example, the performing orders of steps 12201-12204 and steps 12205-12206 could be interchanged, which means the communication device may first determine the flag bit in the first portion and alternatively, it may also first determine whether its HARQ feedback entry exists in the second portion. A person skilled in that art may appreciate that any modification, variation and equivalent should be considered falling within the scope of the appended claims.

Figure 13:
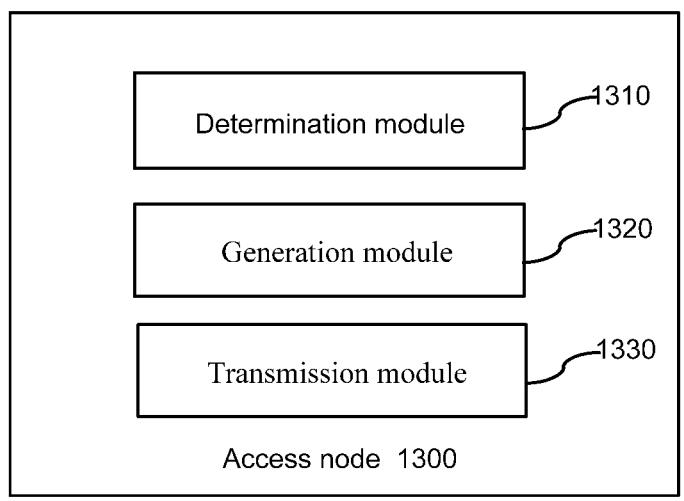
FIG. 13 schematically illustrates a block diagram of an access node according to one or more embodiments of the disclosure.

FIG. 13 schematically illustrates a block diagram of an access node according to one or more embodiments of the disclosure. The access node 1300 may for example correspond to the access node described in connection with FIG. 1. As illustrated, the access node comprises a determination module 1310 for determining a HARQ feedback for each of one or more HARQ processes, for each of the plurality of communication devices, a generating module 1320 for generating a HARQ feedback table for the plurality of communication devices and a transmission module 1330 for transmitting the HARQ feedback table to the plurality of communication devices.

It should be mentioned the above modules correspond to the steps of the method described above, and it is appreciated for the person skilled in the art that the aforementioned modules could be implemented via Programmable Logic Device (PLD), Field Programmable Gate Array (FPGA), Application Specific Integrated Circuit (ASIC), and other implement mechanisms as software products, application specific firmware, hardware products and a combination thereof.

Figure 14:
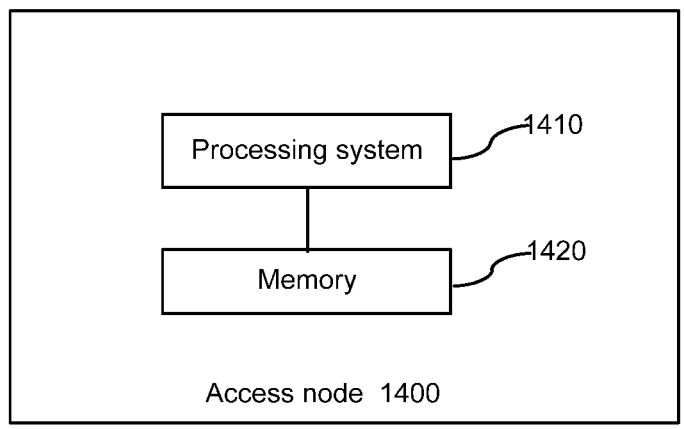
FIG. 14 schematically illustrates a block diagram of another access node according to one or more embodiments of the disclosure.

FIG. 14 schematically illustrates a block diagram of another access node according to one or more embodiments of the disclosure.

The access node may for example correspond to the access nodes described in connection with FIGS. 1-6. The access node 1400 comprises a memory 1420 storing instructions and a processing system 1410 configured to execute the instructions performing the steps of the methods illustrated in FIGS. 1-6. For example, the processing system which includes one or more microprocessor or microcontrollers, as well as other digital hardware, which may include Digital Signal Processors (DSP), special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory includes suitably configured program code to be executed by the processing system so as to implement the above-described functionalities of the access node. In particular, the memory may include various program code modules for causing the access node to perform processes as described above, e.g., corresponding to the method steps of any one of FIGS. 1-6. The access node may also comprise at least one interface (not shown) for communicating with the communication device, e.g. a wireless interface, and/or for communicating with the neighboring access nodes, e.g. a wired or wireless interface. The interface could be coupled to the processing system. Information and data as described above in connection with the methods may be sent via the interface.

Figure 15:
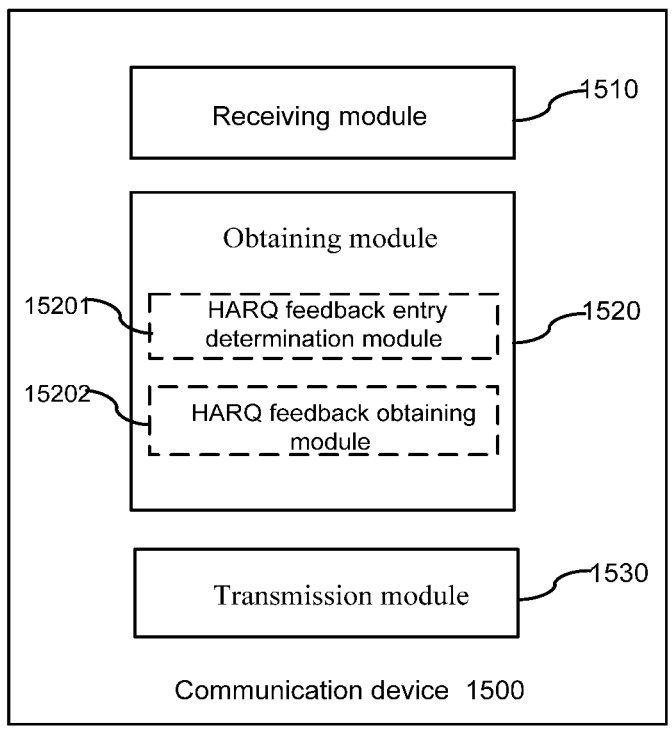
FIG. 15 schematically illustrates a block diagram of a communication device according to one or more embodiments of the disclosure.

FIG. 15 schematically illustrates a block diagram of a communication device according to one or more embodiments of the disclosure.

The communication device may for example correspond to the communication device described in connection with FIG. 7. As illustrated, the communication device 1500 comprises a receiving module 1510 for receiving a HARQ feedback table from an access node, the HARQ feedback table comprising HARQ feedbacks for a plurality of communication devices in which the communication device is included, an obtaining module 1520 for obtaining HARQ feedbacks for the one or more HARQ processes of the communication device, and a transmission module 1530 for performing a retransmission according to the determination of the HARQ feedbacks of the communication device.

Preferably, the obtaining module 1520 may further comprise a HARQ feedback entry determination module 15201 for determining the HARQ feedback entry in the HARQ feedback table, according to a communication device identity of the communication device, and a HARQ feedback obtaining module 15202 for obtaining HARQ feedbacks for the one or more HARQ processes, according to the obtained HARQ feedback entry and a number of the one or more HARQ processes of the communication device, wherein the number of the one or more HARQ processes of the communication device being preconfigured.

It should be mentioned the above modules correspond to the steps of the method described above, and it is appreciated for the person skilled in the art that the aforementioned modules could be implemented via PLD, FPGA, ASIC, and other implementation mechanisms as software products, application specific firmware, hardware products and a combination thereof.

Figure 16:
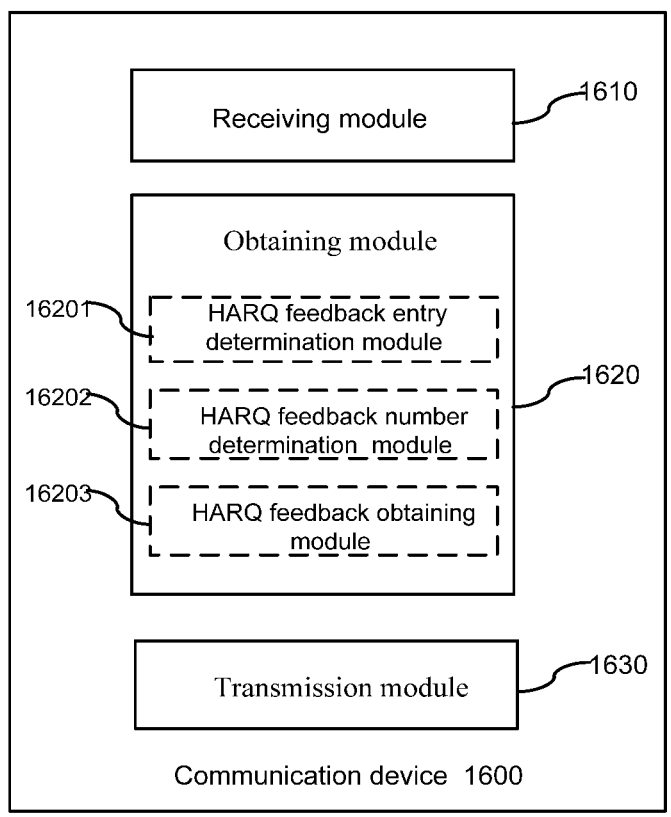
FIG. 16 schematically illustrates a block diagram of another communication device according to one or more embodiments of the disclosure.

FIG. 16 schematically illustrates a block diagram of another communication device according to one or more embodiments of the disclosure.

The communication device may for example correspond to the communication device described in connection with FIG. 8. As illustrated, the communication device 1600 comprises a receiving module 1610 for receiving a HARQ feedback table from an access node, the HARQ feedback table comprising HARQ feedbacks for a plurality of communication devices in which the communication device is included, an obtaining module 1620 for obtaining HARQ feedbacks for the one or more HARQ processes of the communication device, and a transmission module 1630 for performing a retransmission according to the determination of the HARQ feedbacks of the communication device.

Preferably, the obtaining module 1620 may further comprise a HARQ feedback entry determination module 16201 for determining the HARQ feedback entry in the HARQ feedback table, according to a communication device identity of the communication device, a HARQ process number determination module 16202 for determining a HARQ process number for the communication device, the number of the one or more HARQ processes of the communication device being variable and a HARQ feedback obtaining module 16203 for obtaining HARQ feedbacks for the one or more HARQ processes, according to the determined HARQ feedback entry and the determined HARQ process number for the communication device.

It should be mentioned the above modules correspond to the steps of the method described above, and it is appreciated for the person skilled in the art that the aforementioned modules could be implemented via PLD, FPGA, ASIC, and other implementation mechanisms as software products, application specific firmware, hardware products and a combination thereof.

Figure 17:
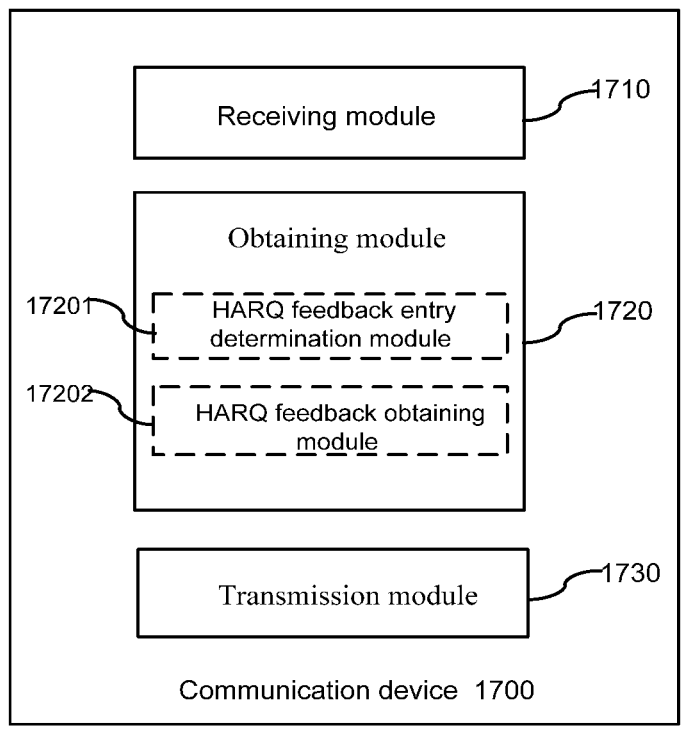
FIG. 17 schematically illustrates a block diagram of another communication device according to one or more embodiments of the disclosure.

FIG. 17 schematically illustrates a block diagram of another communication device according to one or more embodiments of the disclosure.

The communication device may for example correspond to the communication device described in connection with FIG. 9. As illustrated, the communication device 1700 comprises a receiving module 1710 for receiving a HARQ feedback table from an access node, the HARQ feedback table comprising HARQ feedbacks for a plurality of communication devices in which the communication device is included, an obtaining module 1720 for obtaining HARQ feedbacks for the one or more HARQ processes of the communication device, and a transmission module 1730 for performing a retransmission according to the determination of the HARQ feedbacks of the communication device.

Preferably, the obtaining module 1720 may further comprise a HARQ feedback entry determination module 17201 for determining the HARQ feedback entry in the HARQ feedback table, according to a preconfigured position of the HARQ feedback entry in the HARQ feedback table for the communication device, and a HARQ feedback obtaining module 17202 for obtaining HARQ feedbacks for the one or more HARQ processes, according to the determined HARQ feedback entry.

It should be mentioned the above modules correspond to the steps of the method described above, and it is appreciated for the person skilled in the art that the aforementioned modules could be implemented via PLD, FPGA, ASIC, and other implementation mechanisms as software products, application specific firmware, hardware products and a combination thereof.

Figure 18:
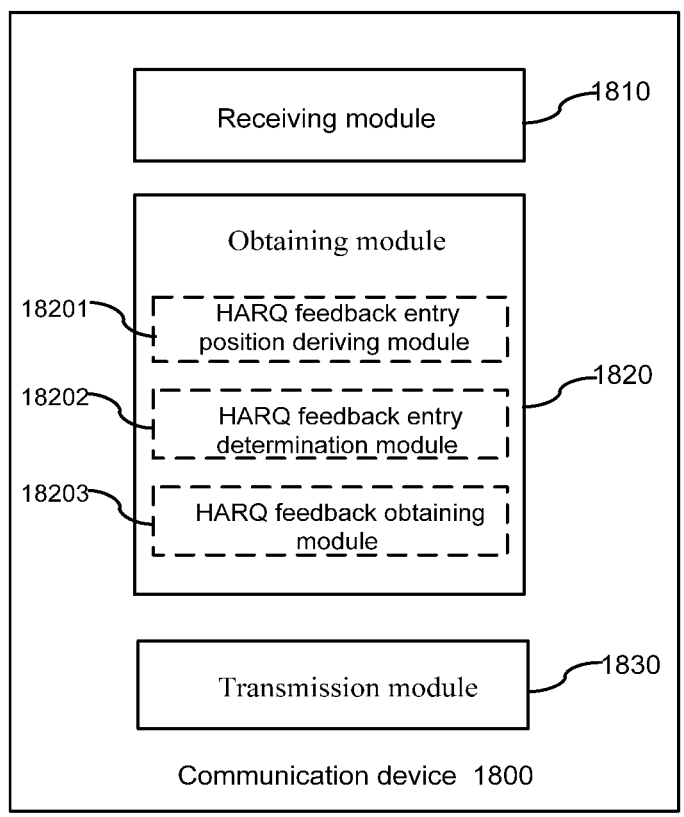
FIG. 18 schematically illustrates a block diagram of another communication device according to one or more embodiments of the disclosure.

FIG. 18 schematically illustrates a block diagram of another communication device according to one or more embodiments of the disclosure.

The communication device may for example correspond to the communication device described in connection with FIG. 10. As illustrated, the communication device 1800 comprises a receiving module 1810 for receiving a HARQ feedback table from an access node, the HARQ feedback table comprising HARQ feedbacks for a plurality of communication devices in which the communication device is included, an obtaining module 1820 for obtaining HARQ feedbacks for the one or more HARQ processes of the communication device, and a transmission module 1830 for performing a retransmission according to the determination of the HARQ feedbacks of the communication device.

Preferably, the obtaining module 1820 may further comprise a HARQ feedback entry deriving module 18201 for deriving a position of the HARQ feedback entry in the HARQ feedback table, according to an uplink resource allocation for the communication device, a HARQ feedback entry determination module 18202 for determining the HARQ feedback entry in the HARQ feedback table, according to the derived position of the HARQ feedback entry in the HARQ feedback table, and a HARQ feedback obtaining module 18203 for obtaining HARQ feedbacks for the one or more HARQ processes, according to the determined HARQ feedback entry.

It should be mentioned the above modules correspond to the steps of the method described above, and it is appreciated for the person skilled in the art that the aforementioned modules could be implemented via PLD, FPGA, ASIC, and other implementation mechanisms as software products, application specific firmware, hardware products and a combination thereof.

Figure 19:
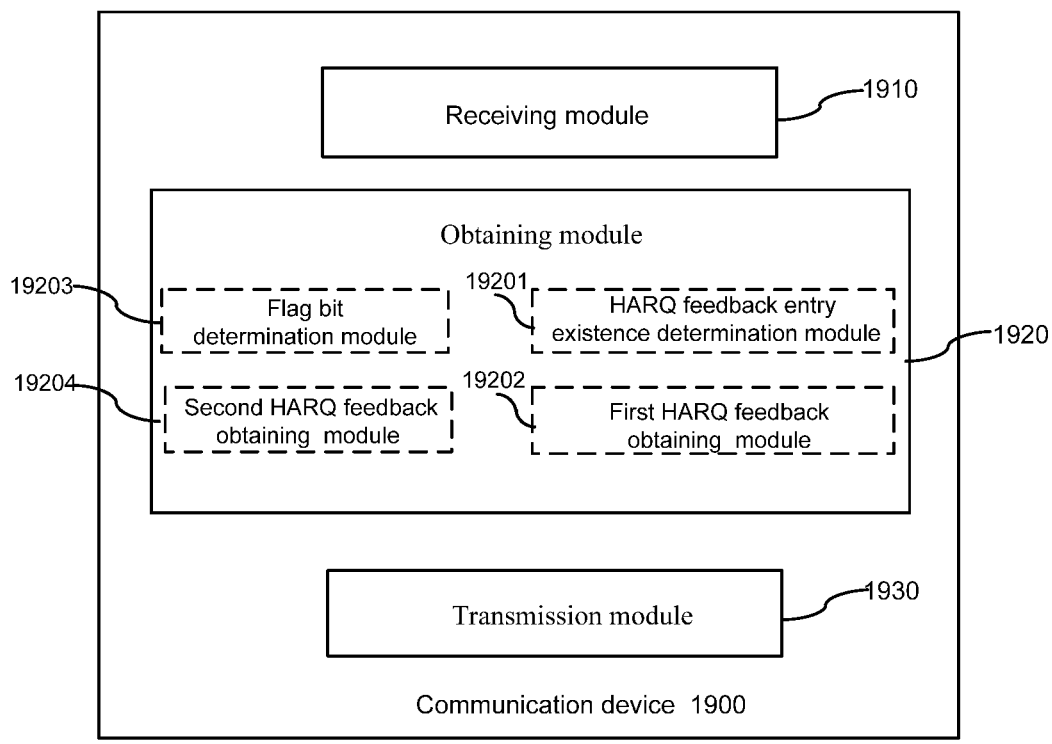
FIG. 19 schematically illustrates a block diagram of another communication device according to one or more embodiments of the disclosure.

FIG. 19 schematically illustrates a block diagram of another communication device according to one or more embodiments of the disclosure.

The communication device may for example correspond to the communication device described in connection with FIG. 11. As illustrated, the communication device 1900 comprises a receiving module 1910 for receiving a HARQ feedback table from an access node, the HARQ feedback table comprising HARQ feedbacks for a plurality of communication devices in which the communication device is included, an obtaining module 1920 for obtaining HARQ feedbacks for the one or more HARQ processes of the communication device, and a transmission module 1930 for performing a retransmission according to the determination of the HARQ feedbacks of the communication device.

Preferably, the obtaining module 1920 may further comprise a HARQ feedback entry existence determination module 19201 for determining whether a HARQ feedback entry of the communication device existing in a second portion of the HARQ feedback table, according to a communication device identity for the communication device, a first HARQ feedback obtaining module 19202 for in response to determining the HARQ feedback entry of the communication device existing in a second portion of the HARQ feedback table, obtaining HARQ feedbacks for the one or more HARQ processes, according to the HARQ feedback entry of the communication device, and in response to determining the HARQ feedback entry of the communication device not existing in a second portion of the HARQ feedback table, obtaining HARQ feedbacks for the one or more HARQ processes, according to a common bit in a first portion of the HARQ feedback table, Preferably, the obtaining module 1920 may further comprise a flag bit determination module 19203 for determining a flag bit in a first portion of the HARQ feedback table, and the flag bit indicating whether the second portion is empty in the HARQ feedback table, and a second HARQ feedback obtaining module 19204 for obtaining HARQ feedbacks for the one or more HARQ processes, according to the common bit in the first portion of the HARQ feedback table, in response to determining the second portion in the HARQ feedback is empty.

It should be mentioned the above modules correspond to the steps of the method described above, and it is appreciated for the person skilled in the art that the aforementioned modules could be implemented via PLD, FPGA, ASIC, and other implementation mechanisms as software products, application specific firmware, hardware products and a combination thereof.

Figure 20:
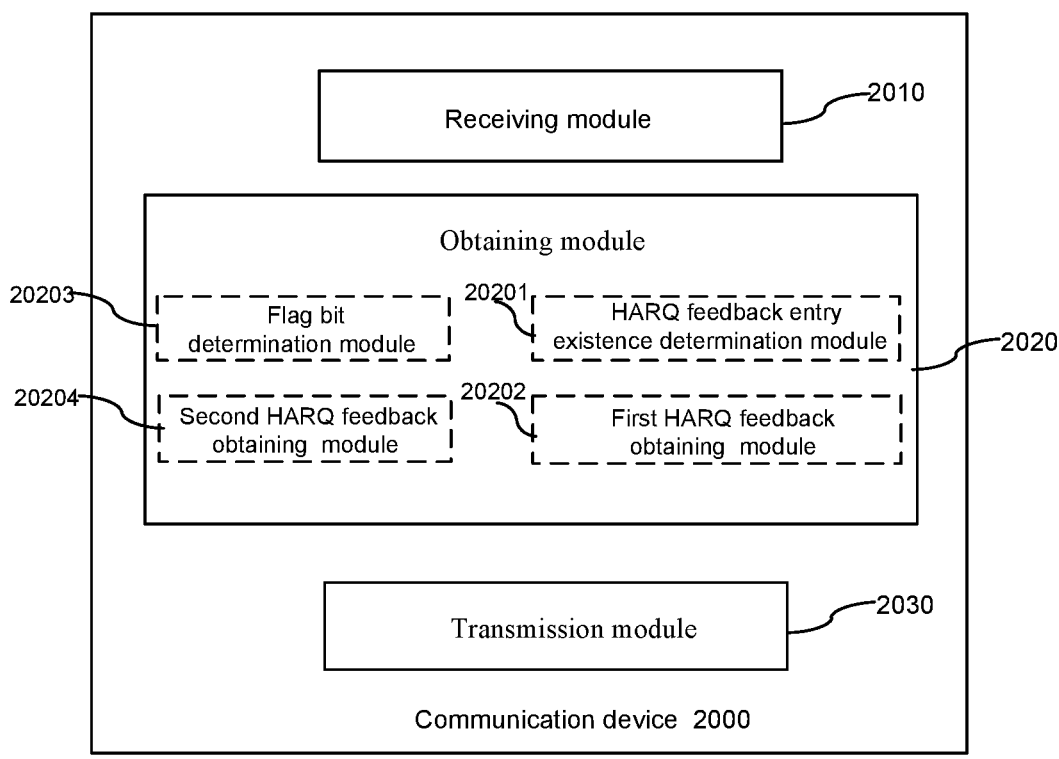
FIG. 20 schematically illustrates a block diagram of another communication device according to one or more embodiments of the disclosure.

FIG. 20 schematically illustrates a block diagram of another communication device according to one or more embodiments of the disclosure.

The communication device may for example correspond to the communication device described in connection with FIG. 12. As illustrated, the communication device 2000 comprises a receiving module 2010 for receiving a HARQ feedback table from an access node, the HARQ feedback table comprising HARQ feedbacks for a plurality of communication devices in which the communication device is included, an obtaining module 2020 for obtaining HARQ feedbacks for the one or more HARQ processes of the communication device, and a transmission module 2030 for performing a retransmission according to the determination of the HARQ feedbacks of the communication device.

Preferably, the obtaining module 2020 may further comprise a HARQ feedback entry existence determination module 20201 for determining whether a HARQ feedback entry of the communication device existing in a second portion of the HARQ feedback table, according to a communication device identity for the communication device, and a first HARQ feedback obtaining module 20202 for in response to determining the HARQ feedback entry of the communication device existing in a second portion of the HARQ feedback table, determining at least one HARQ process identity of the at least one HARQ process from the one or more HARQ processes in a second portion of the HARQ feedback table and obtaining HARQ feedbacks for the one or more HARQ processes, according to a common bit in a first portion of the HARQ feedback table and the determined at least one HARQ process identity, and in response to determining the HARQ feedback entry of the communication device not existing in a second portion of the HARQ feedback table, obtaining HARQ feedbacks for the one or more HARQ processes, according to a common bit in a first portion of the HARQ feedback table.

Preferably, the obtaining module 2020 may further comprise a flag bit determination module 20203 for determining a flag bit in a first portion of the HARQ feedback table, and the flag bit indicating whether the second portion is empty in the HARQ feedback table, and a second HARQ feedback obtaining module 20204 for obtaining HARQ feedbacks for the one or more HARQ processes, according to the common bit in the first portion of the HARQ feedback table, in response to determining the second portion in the HARQ feedback is empty.

It should be mentioned the above modules correspond to the steps of the method described above, and it is appreciated for the person skilled in the art that the aforementioned modules could be implemented via PLD, FPGA, ASIC, and other implementation mechanisms as software products, application specific firmware, hardware products and a combination thereof.

Figure 21:
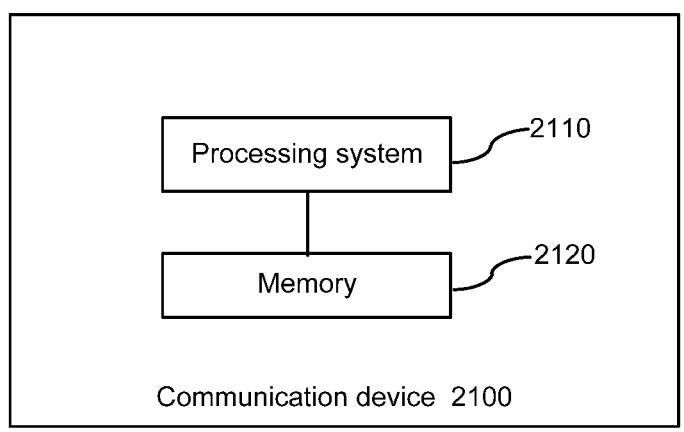
FIG. 21 schematically illustrates a block diagram of another communication device according to one or more embodiments of the disclosure.

FIG. 21 schematically illustrates a block diagram of another communication device according to one or more embodiments of the disclosure.

The communication device may for example correspond to the communication devices described in connection with FIGS. 7-12. The communication device comprises a memory 2120 storing instructions and a processing system 2110 configured to execute the instructions performing the steps of the methods illustrated in FIGS. 7-12. For example, the processing system which includes one or more microprocessor or microcontrollers, as well as other digital hardware, which may include DSP, special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory may include a ROM, e.g., a flash ROM, a RAM, e.g., a DRAM or SRAM, a mass storage, e.g., a hard disk or solid state disk, or the like. The memory includes suitably configured program code to be executed by the processing system so as to implement the above-described functionalities of the communication device. In particular, the memory may include various program code modules for causing the communication device to perform processes as described above, e.g., corresponding to the method steps of any one of FIGS. 7-12. The communication device may also comprise at least one interface (not shown) for communicating with the access node, e.g. a wireless interface, and/or for communicating with the neighboring communication device nodes, e.g. a wired or wireless interface. The interface could be coupled to the processing system. Information and data as described above in connection with the methods may be sent via the interface.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system. The present disclosure has been specifically illustrated and explained with reference to the preferred embodiments. The skilled in the art should understand various changes thereto in form and details may be made without departing from the spirit and scope of the present disclosure.

The invention claimed is:

1. A method for a first communication device communicating with an access node in a wireless network, the first communication device corresponding to one or more HARQ processes, the method comprising:
    receiving a HARQ feedback table transmitted by the access node, the HARQ feedback table comprising a HARQ feedback entry for each communication device included in a set of two or more communication devices, wherein the set of two or more communication devices comprises the first communication device and a second communication device, wherein the HARQ feedback entry for the first communication device comprises a first communication device identifier identifying the first communication device and at least two HARQ feedbacks, and wherein said at least two HARQ feedbacks include a first HARQ feedback for a first HARQ process of the first communication device and a second HARQ feedback for a second HARQ process of the first communication device;
    obtaining the first HARQ feedback for the first HARQ process;
    obtaining the second HARQ feedback for the second HARQ process; and
    performing a retransmission based on the first HARQ feedback.

2. The method of claim 1, wherein the HARQ feedback entry for the second communication device comprises a second communication device identifier identifying the second communication device and at least a first HARQ feedback for a first HARQ process of the second communication device.

3. The method of claim 1, wherein
    obtaining the first HARQ feedback for the first HARQ process comprises identifying the HARQ feedback entry for the first communication device based on the first communication device identifier identifying the first communication device.

4. The method of claim 1, wherein
    the HARQ feedback table further comprises a flag, the value of which indicates that the HARQ feedback table comprises at least one HARQ feedback entry.

5. The method of claim 4, wherein
    the HARQ feedback table further comprises a common acknowledgement bit.

6. The method of claim 5, wherein
    the first HARQ feedback is a HARQ process identity identifying the first HARQ process, and
    the retransmission is performed based on the HARQ process identity and the value of the common acknowledgement bit.

7. The method of claim 1, wherein
    the HARQ feedback table comprises a first portion and a second portion,
    the second portion contains each one of said HARQ feedback entries, and
    the first portion comprises a flag indicating that the second portion contains at least one HARQ feedback entry.

8. The method of claim 7, wherein
    the first portion further comprises a common acknowledgement bit, and
    the retransmission is performed based on the first HARQ feedback and the value of the common acknowledgement bit.

9. The method of claim 8, wherein the first HARQ feedback is a HARQ process identity identifying the first HARQ process.

10. The method of claim 1, wherein the HARQ feedback table is received in a physical downlink feedback channel transmitted toward the plurality of communication devices by the access node.

11. An access node in a wireless network, the access node comprising:
    a transmitter;
    a memory storing instructions; and
    a processing system configured to execute the instructions, wherein the access node is configured to:
    generate a HARQ feedback table; and
    transmit the HARQ feedback table toward a plurality of communication devices, wherein the HARQ feedback table comprising a HARQ feedback entry for each communication device included in a set of two or more communication devices, wherein the set of communication devices comprises the first communication device and a second communication device, wherein the HARQ feedback entry for the first communication device comprises a first communication device identifier identifying the first communication device and at least two HARQ feedbacks, and wherein said at least two HARQ feedbacks include a first HARQ feedback for a first HARQ process of the first communication device and a second HARQ feedback for a second HARQ process of the first communication device.

12. The access node of claim 11, wherein the HARQ feedback entry for the second communication device comprises a second communication device identifier identifying the second communication device and at least a first HARQ feedback for a first HARQ process of the second communication device.

13. The access node of claim 11, wherein
    the HARQ feedback table further comprises a flag, the value of which indicates that the HARQ feedback table comprises at least one HARQ feedback entry.

14. The access node of claim 13, wherein
    the HARQ feedback table further comprises a common acknowledgement bit.

15. The access node of claim 14, wherein
    the first HARQ feedback is a HARQ process identity identifying the first HARQ process.

16. The access node of claim 11, wherein
    the HARQ feedback table comprises a first portion and a second portion,
    the second portion contains each one of said HARQ feedback entries, and
    the first portion comprises a flag indicating that the second portion contains at least one HARQ feedback entry.

17. The access node of claim 16, wherein
    the first portion further comprises a common acknowledgement bit, and
    the first HARQ feedback is a HARQ process identity identifying the first HARQ process.

18. A communication device in a wireless network, the communication device comprising:
- a memory;
- a receiver for receiving a HARQ feedback table transmitted by an access node, the HARQ feedback table comprising a HARQ feedback entry for each communication device included in a set of two or more communication devices, wherein the set of communication devices comprises the first communication device and a second communication device, wherein the HARQ feedback entry for the first communication device comprises a first communication device identifier identifying the first communication device and at least two HARQ feedbacks, and wherein said at least two HARQ feedbacks include a first HARQ feedback for a first HARQ process of the first communication device and a second HARQ feedback for a second HARQ process of the first communication device; and
- processing circuitry, coupled to the memory and the receiver, configured to:
 - obtain the first HARQ feedback for the first HARQ process;
 - obtain the second HARQ feedback for the second HARQ process; and
 - perform a retransmission based on the first HARQ feedback.

19. The communication device of claim 18, wherein the HARQ feedback table further comprises a flag, the value of which indicates that the HARQ feedback table comprises at least one HARQ feedback entry.

20. The communication device of claim 19, wherein
the HARQ feedback table further comprises a common acknowledgement bit,
the first HARQ feedback is a HARQ process identity identifying the first HARQ process, and
the communication device performs the retransmission based on the HARQ process identity and the value of the common acknowledgement bit.

21. The communication device of claim 18, wherein
the HARQ feedback table comprises a first portion and a second portion,
the second portion contains each one of said HARQ feedback entries, and
the first portion comprises a flag indicating that the second portion contains at least one HARQ feedback entry.

22. The communication device of claim 18, wherein first HARQ feedback is a single bit indicating an ACK or a NACK.

* * * * *